Patented Nov. 3, 1931

1,830,300

UNITED STATES PATENT OFFICE

EDMOND T. TISZA, OF NEW YORK, AND BERNARD JOOS, OF YONKERS, NEW YORK, ASSIGNORS TO THE PYRIDIUM CORPORATION, OF NEPERA PARK, NEW YORK, A CORPORATION OF NEW YORK

METHOD OF OBTAINING HYDROXY-PHENYL-AZO-ALPHA-ALPHA-DIAMINO-PYRIDINES

No Drawing. Application filed March 18, 1929. Serial No. 348,114.

This invention is an improvement in methods of obtaining hydroxy-phenyl-azo-alpha-alpha-diamino-pyridines.

A primary object of the invention is the provision of medicinal substances suitable for use in the treatment of germ infections, and as an antiseptic, and of a nature to be dissolved either in the acid medium of the stomach or in the alkaline fluids of the intestines.

Another object is a method of preparing such substances from aryl-azo-alpha-alpha-diamino-pyridine, and in methods of utilizing the same.

Substances of this series hitherto made, were, with very few exceptions, soluble only in neutral or acid media. When administered orally, they were supposed to be assimilated in the stomach. In case they were administered directly into the intestines or when they, for any reason were not dissolved in the stomach, they may pass through the intestinal canal without any change, and may be found partly in the fæces in unchanged form.

According to this invention aryl-azo-alpha-alpha-diamino-pyridines are made which, due to their amphoteric character, are able to build salts of two series. Being amines they are able to build salts with acids, such as hydrochlorides, sulphates, acetates, etc., on the other hand being phenols, they build alkali salts, such as phenolates of sodium, potassium, ammonium, calcium, etc. These properties of the new compounds give them a larger penetrating power than the ones hitherto prepared had.

When the hydrochlorides of aryl-azo-alpha-alpha-diamino-pyridines come in contact with the alkaline body fluids or tissues, they precipitate the basic dyestuff which is only very slightly soluble, and therefore is absorbed very slowly. The new compounds on the other hand, are soluble in alkaline medium and therefore are able to penetrate into the tissues much better. The same stands in regards to their action in bacteriological media. They will not precipitate in media such as gelatine or agar which are slightly alkaline.

Investigations show that they have a decided bacteriological action on cocci, bacilli, and other pathogenic germs, and also have to a certain extent trypanocidal properties.

The new compounds can be administered the usual ways, in solutions, tablets, capsules, ointments or powder form. Should it be desired to administer them directly into the intestines, the tablets or capsules should be keratin coated.

These new compounds are made by copulation of diazotized p-, m-, or o-aminophenol with alpha-alpha-diamino-pyridine.

Example I 20 grams p-aminophenol (M. P. 182°) were dissolved in 112 cc. hydrochloric acid of 24% and 200 cc. water. It is necessary to heat up the mixture to 40–50° C. to make a complete solution. The solution was then filtered and cooled down to 5° C. The p-aminophenol then was diazotized with a 20% solution of sodium nitrite. The temperature during diazotization was kept at 5–7° C. The diazotization process naturally was controlled with iodo-starch paper.

Into this resulting diazotized p-aminophenol solution, a solution of 20 grams alpha-alpha-diamino-pyridine in 56 cc. hydrochloric acid of 24%, and 50 cc. water is added with constant, vigorous stirring. The color of the mixture turns red, and the mixture has a strong acid reaction to congo paper. After the mixture has stood three or four hours the excess of hydrochloric acid is removed, with a saturated aqueous solution of sodium acetate until a weak but still clear acid reaction on congo paper is obtained. The mixture now is put aside to stand over night and next morning filtered on a suction filter, and washed with water.

The black colored greenish glittering hydrochloride can be purified by recrystallization out of hot water. This hydrochloride of p-hydroxy-phenyl-azo-alpha-alpha-diamino-pyridine can be changed into the free base by dissolving in dilute sodium hydroxide, the solution filtered, cooled down with some pieces of ice and precipitated with hydrochloric acid, till the solution shows neutral reaction. The precipitate has a yellow color. The precipitated p-hydroxy-phenyl-azo-alpha-alpha-diamino-pyridine is then collected on a suction filter and dried in a vacuum desiccator. It can be recrystallized out of methanol.

The purified free base can be converted into the hydrochloride, by dissolving it in the calculated amount of hydrochloric acid in hot water and cooled down for crystallization.

Alkali salts of the p-hydroxy-phenyl-azo-alpha-alpha-diamino-pyridine can be made by the usual methods of obtaining phenolates. For instance, the soda salt can be prepared by dissolving a calculated amount of metallic sodium in a small amount of absolute methanol (or ethanol) and adding to this alcoholate the free phenol. Out of this alcoholic solution the soda salt is precipitated with carbon-tetrachloride, chloroform or ether.

Properties of the p-hydroxy-compounds. The hydrochloride of the p-hydroxy-compound crystallizes out of dilute hydrochloric acid in long, slender prisms of black color. It partly decomposes at 211–213° C. It is slightly soluble in cold water or alcohol, more soluble in hot water, and insoluble in ether, chloroform, acetone or toluol. It is soluble in dilute or concentrated hydrochloric acid with violet color, in dilute or concentrated sulphuric acid with violet-red color, and in dilute or concentrated sodium hydroxide with dark red color.

The free base crystallizes out of water mostly as clusters of thin, slender, yellow needles, and some small short yellow prisms. It melts with decomposition at 218–220° C. It is slightly soluble in cold or hot water, ether and chloroform, more soluble in alcohol and acetone, and insoluble in toluol. It is also soluble in dilute or concentrated hydrochloric acid with violet color, in dilute or concentrated sulphuric acid with violet-red color, and in dilute or concentrated sodium hydroxide with dark red color.

The soda salt of the p-hydroxy-compound crystallizes out of a mixture of ether and chloroform in yellow plates. Its melting point is 106° C. It is soluble in cold and very soluble in hot water with red color, slightly soluble in chloroform and toluol, somewhat more in acetone and ether, fairly soluble in alcohol. Its solubility in acids is the same as the two previous compounds, that it, soluble in dilute or concentrated hydrochloric acid with violet color, in dilute or concentrated sulphuric acid with violet-red color, and in dilute or concentrated sodium hydroxide with dark red color.

*Example II*

10 grams m-aminophenol (M. P. 121°) were dissolved in 42 cc. hydrochloric acid and 30 cc. water. The solution was filtered and cooled down to 5° C. and diazotized with a 20% solution of sodium nitrite. The temperature during diazotization was kept at 5–7° C. The diazotization process naturally was controlled with iodo-starch paper. Into the resulting diazotized m-aminophenol solution, a solution of 10 grams alpha-alpha-diamino-pyridine in 14 cc. hydrochloric acid of 24% and 20 cc. water was added, with constant, vigorous stirring.

The color of the mixture becomes slightly darker, and the mixture has a strong acid reaction to congo paper. The mixture is now put aside to stand over night, and next morning filtered on a suction filter and washed with water.

The dark red colored hydrochloride of the resulting dye can be turned into the free base by dissolving in sodium hydroxide, the solution filtered, cooled down with some pieces of ice and precipitated with hydrochloric acid, till the solution shows neutral reaction. The precipitate has a yellow color. The precipitated m-hydroxy-phenyl-azo-alpha-alpha-diamino-pyridine is then collected on suction filter and dried in vacuum desiccator. It can be recrystallized out of methanol. The purified free base can be converted into the hydrochloride, by dissolving same in the calculated amount of hydrochloric acid in hot water and cooled down for crystallization. Alkali salts of the m-hydroxy-phenyl-azo-alpha-alpha-diamino-pyridine can be made by the usual methods of obtaining phenolates, as described in Example I.

Properties of the m-hydroxy-compounds. The hydrochloride of the m-hydroxy-compound crystallizes out of water in microcrystalline powder. It melts with decomposition at 211–213° C. It is soluble in cold water, more so in hot water, fairly soluble in alcohol, slightly in acetone, and insoluble in ether, chloroform and toluol. It is soluble in dilute or concentrated hydrochloric acid with red color, in dilute or concentrated sulphuric acid with red color, and in dilute or concentrated sodium hydroxide with brownish red color.

The free base crystallizes out of water in long, extremely slender yellow prisms. Its melting point is at 212–213° C. It is very little soluble in cold water, somewhat more so in hot water. It is soluble in alcohol, slightly in ether and chloroform, very soluble in acetone, and insoluble in toluol. It is soluble in dilute or concentrated hydrochloric acid with red color, in dilute or concentrated sulphuric acid with red color, and in dilute or concentrated sodium hydroxide with brownish-red color.

The soda salt of the m-hydroxy-compound crystallizes out of ether mostly in plates and some short thick prisms of dark yellow color. It is very soluble in cold and hot water with orange color, but will precipitate out of the solution after a short while. It is slightly soluble in ether, chloroform, acetone and toluol, more soluble in alcohol. Its solubility in acid is the same as the previous compounds, that is, soluble in dilute or concentrated hydrochloric acid with red color, in dilute or concentrated sulphuric acid with red color, and in dilute or concentrated sodium hydroxide with brownish red color.

*Example III*

10 grams o-aminophenol (M. P. 163°) is dissolved in 56 cc. hydrochloric acid of 24% and 30 cc. water. It is necessary to heat up the mixture to 40–50° C. to make a solution. The solution is then filtered and cooled down to 5° C. The o-aminophenol then is diazotized with a 20% solution of sodium nitrite. The temperature during diazotization is kept at 5–7° C. The diazotization process naturally is controlled with iodo-starch paper. Into the resulting diazotized o-aminophenol solution, a solution of 10 grams alpha-alpha-diamino-pyridine in 28 cc. hydrochloric acid of 24% and 20 cc. water, is added with constant, vigorous stirring.

There is no noticeable change in the color of the mixture, and the mixture has a strong acid reaction to congo paper. The mixture is now put aside to stand over night and the next morning filtered on a suction filter and washed with water. The resulting yellow colored hydrochloride of the dyestuff is recrystallized out of water containing some hydrochloric acid. When this compound is heated either in water, or weak acid solution, it partly turns into an insoluble compound, which is probably an internal salt, due to the o-position of OH group to the azo group, in a similar way as an internal salt is built by the combination of diazotized o-anthranilic acid with alpha-alpha-diamino-pyridine as described in U. S. Patent No. 1,680,110.

Alkali salts of this o-hydroxy-phenyl-azo-alpha-alpha-diamino-pyridine can be made by the usual methods of obtaining phenolates, as described in Example I.

Properties of the o-hydroxy-compounds. The hydrochloride of the o-hydroxy-compound crystallizes out of water in slender yellow prisms. It melts with decomposition at 220–222° C. It is soluble in cold and more so in hot water. Fairly soluble in alcohol, slightly in ether, chloroform, and acetone, and insoluble in toluol. It is soluble in dilute or concentrated hydrochloric acid with violet-red color, in dilute or concentrated sulphuric acid with violet-red color, and in dilute or concentrated sodium hydroxide with red color.

The free base precipitates out of an aqueous solution of the hydrochloride salt with dilute sodium hydroxide in yellow color. Its melting point is 186° C. It is slightly soluble in cold or hot water, alcohol, ether, chloroform and acetone, and insoluble in toluol. It is soluble in dilute or concentrated hydrochloric acid with violet-red color, in dilute or concentrated sulphuric acid with violet-red color, and in dilute or concentrated sodium hydroxide with red color. The sodium salt of the o-hydroxy-compound crystallizes out of alcohol with addition of ether in long yellow needles. It is slightly soluble in cold and hot water with orange color, and slightly soluble in alcohol, ether, chloroform, acetone, and toluol. It is soluble in dilute or concentrated hydrochloric acid with violet-red color, in dilute or concentrated sulphuric acid with violet red color, and in dilute or concentrated sodium hydroxide with red color.

The three compounds described above are, as to be expected of similar character. There is a distinction in the color reactions they give with concentrated acid or alkali. The difference in the color is very noticeable, especially if the reactions are made on a porcelain plate next to each other. It is believable that the deepening of the color, for instance, when concentrated hydrochloric acid is added, is due to building of di- or tri-hydrochlorides, in a similar way as phenyl-azo-alpha-alpha-diamino-pyridine dihydrochloride acts.

As the formula for phenyl-azo-alpha-alpha-diamino-pyridine is described,

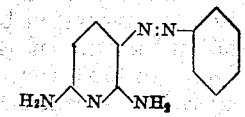

and as these compounds are made, through diazotization of the three isomer amino phenols and coupling with alpha-alpha-diamino-pyridine, the formulas for them should be as follows:

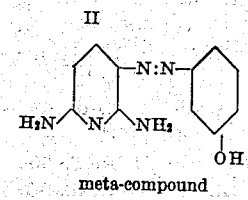

para-compound

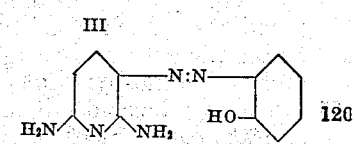

meta-compound     ortho-compound

In these formulas we designated the place for the copulation, the beta position in the pyridine nucleus. In general the azo group will go into para position to the amino group, or into the ortho, if the para position is occupied. In this case the azo group is in para position to one and in ortho position to the other amino group. The compounds then will be para-, meta-, or ortho-hydroxy-beta-phenyl-azo-alpha-alpha-diamino-pyridines. There is a possibility that some of the gamma-azo-compound is formed and that this isomer is present in the above described preparations.

The primary intermediate products, the three isomer, p-, m-, and o-amino phenols are to a certain extent contaminated with their isomers, therefore, the end product may contain small amounts of the isomers. This may account for the slight variations in the melting points.

As already mentioned, these new compounds form two series of salts, corresponding to their amphoteric character. The free amines (phenols) are slightly soluble in cold water and show a very weak basic character, in fact they appear to be neutral to litmus or congo paper. The salts of phenyl-azo-alpha-alpha-diamino-pyridine already show the tendency, especially the salts with weak acids (organic acids) to dissociate in aqueous solution. This tendency is more pronounced in these compounds, the basic character of them being somewhat decreased, with the introduction of the weak acid hydroxy group. This explains the instability of the sodium salts in aqueous solutions.

The statements as regards to the formulas, and in regard to structure are theoretical, and are not intended as limitations.

While these compounds have distinct dyeing properties they are intended primarily for pharmaceutical purposes. Investigations show that the introduction of the hydroxy group into phenyl-azo-alpha-alpha-diamino-pyridine does not show any noticeable increase in toxicity, and it can be said that these compounds are relatively non-toxic. Each isomer was tested bacteriologically alone, and in mixture of the different isomers, and found to have very strong bactericidal and antiseptic action on pathogenic germs in various dilutions. These compounds also have trypanocidal properties to a certain extent.

What is claimed as new is:—

1. The method of obtaining an isomer of hydroxy-phenyl-azo-alpha-alpha-diamino-pyridines, which consists in diazotizing an amino-phenol, and coupling with alpha-alpha-diamino-pyridine in an acid solution, dissolving the acid salt in an alkali, and precipitating the free base with an acid.

2. The method of obtaining isomers of hydroxy-phenyl-azo-alpha-alpha-diamino-pyridines, which consists in diazotizing amino-phenols, coupling with alpha-alpha-diamino-pyridine in an acid solution, dissolving the acid salts in an alkali, and precipitating the free base with an acid.

3. The method of obtaining an isomer of hydroxy-phenyl-azo-alpha-alpha-diamino-pyridine hydrochloride, which consists in diazotizing an amino-phenol and coupling with alpha-alpha-diamino-pyridine in an acid solution, dissolving the acid salt in an alkali, precipitating the free base with an acid, and converting the free base into the hydrochloride by dissolving it in hydrochloric acid in hot water.

4. The step in the method of obtaining isomers of hydroxy-phenyl-azo-alpha-alpha-diamino-pyridine hydrochloride, which consists in converting isomers of hydroxy-phenyl-azo-alpha-alpha-diamino-pyridine into the hydrochlorides by dissolving them in hydrochloric acid in hot water.

5. The method of obtaining the alkali salts of hydroxy-phenyl-azo-alpha-alpha-diamino-pyridine, which consists in dissolving the hydroxy-phenyl-azo-alpha-alpha-diamino-pyridine in an alcoholate, and precipitating the salt from the solution.

6. The method of obtaining an azo dye which consists in diazotizing an aminophenol and coupling with alpha-alpha-diamino-pyridine.

7. The method of obtaining an alkali soluble azo compound of alpha-alpha-diamino-pyridine, which consists in coupling a diazotized isomer of amino-phenol with alpha-alpha-diamino-pyridine in an acid solution.

8. The method of obtaining alkali soluble azo compounds of alpha-alpha-diamino-pyridine, which consists in coupling diazotized isomers of amino-phenols with alpha-alpha-diamino-pyridine in an acid solution.

9. A medicinal substance soluble in the acid fluids of the stomach and the alkaline fluids of the intestines, including an isomer of hydroxy-phenyl-azo-alpha-alpha-diamino-pyridines.

10. A medicinal substance soluble in the acid fluids of the stomach and the alkaline fluids of the intestines, including isomers of hydroxy-phenyl-azo-alpha-alpha-diamino-pyridines.

11. A medicinal substance soluble in the acid fluids of the stomach and the alkaline fluids of the intestines, composed of isomers of hydroxy-phenyl-azo-alpha-alpha-diamino-pyridine hydrochlorides.

12. As a medicinal agent the alkali salt of hydroxy-phenyl-azo-alpha-alpha-diamino-pyridine.

13. As a new article of manufacture, an isomer of hydroxy-phenyl-azo-alpha-alpha-diamino-pyridine.

Signed at Yonkers in the county of Westchester and State of New York this 15th day of March, 1929, A. D.

DR. BERNARD JOOS.
EDMOND T. TISZA.